US 6,493,375 B1

(12) United States Patent
Kodeda et al.

(10) Patent No.: US 6,493,375 B1
(45) Date of Patent: Dec. 10, 2002

(54) ADJUSTABLE MOUNTING UNIT FOR AN OPTICAL ELEMENT OF A GAS LASER

(75) Inventors: Hans Kodeda, Landshut (DE); Helmut Frowein, Munich (DE); Claus Strowitzki, Gilching (DE); Alexander Hohla, Munich (DE)

(73) Assignee: TuiLaser AG, Germering (DE)

( * ) Notice: Subject to any disclaimer, the term of this patent is extended or adjusted under 35 U.S.C. 154(b) by 0 days.

(21) Appl. No.: 09/511,648

(22) Filed: Feb. 22, 2000

(51) Int. Cl.[7] ............................. H01S 3/22; H01S 3/03; H01S 3/08
(52) U.S. Cl. ..................... 372/107; 372/108; 372/55; 372/65
(58) Field of Search ................. 372/107, 108, 372/61, 65, 55, 58

(56) References Cited

U.S. PATENT DOCUMENTS

| 3,400,596 | A | 9/1968 | Laich | 74/89.23 |
|---|---|---|---|---|
| 3,753,144 | A | 8/1973 | Kearns et al. | 372/35 |
| 3,877,794 | A | 4/1975 | Kulle et al. | 350/187 |
| 3,886,474 | A | 5/1975 | Hensolt et al. | 372/107 |
| 4,423,510 | A | 12/1983 | Pack et al. | 372/56 |
| 4,448,385 | A | 5/1984 | Matthys | 248/476 |
| 4,534,034 | A | 8/1985 | Hohla et al. | 372/59 |
| 4,541,848 | A | 9/1985 | Masuda et al. | 361/235 |
| 4,638,486 | A | 1/1987 | Dost et al. | 372/107 |

(List continued on next page.)

FOREIGN PATENT DOCUMENTS

| DE | 31 30 399 A1 | 2/1983 | |
|---|---|---|---|
| DE | 32 12928 C2 | 10/1983 | |
| DE | 37 10 525 C2 | 10/1987 | |
| DE | 3718467 A | 12/1988 | H01S/3/086 |
| DE | 297 15 466 U1 | 10/1997 | |
| DE | 198 40 035 A1 | 4/1999 | |
| EP | 0456875 A | 11/1991 | H01S/3/086 |
| JP | 2250383 | 10/1990 | H01S/3/086 |
| JP | 05067823 | 3/1993 | |
| JP | 5152643 A | 6/1993 | H01S/3/034 |
| JP | 06237034 | 8/1994 | |

OTHER PUBLICATIONS

Kodeda, et al., "An Optical Element Holding an Extraction Device," US Application 09/510,666 filed Feb. 22, 2000 (Status: pending).
Strowtizki, et al., "Gas Laser Discharge Unit," US Application 09/510,539 filed Feb. 22, 2000 (Status: pending).

(List continued on next page.)

Primary Examiner—Paul Ip
Assistant Examiner—Armando Rodriquez
(74) Attorney, Agent, or Firm—Ivor R. Elrifi; Barry J. Marenberg; Mintz, Levin, Cohn, Ferris, Glovsky and Popeo, P.C.

(57) ABSTRACT

An adjustable mounting unit for an optical element of a gas laser is provided. The typical gas laser for which the mounting unit will be used comprises a tube having a first end wall at one end and a second end wall at the other end, an optical axis extending longitudinally through the tube, and a port in the first end wall through which the optical axis passes. The mounting unit includes a rigid support structure having an aperture therein and an optical element mounted within the aperture. In addition, at least three adjustable mounting devices are used to attach the support structure to the laser tube. The mounting points are preferably selected so that they are displaced in an axial direction by substantially the same amount due to dimensional changes in the laser occurring during operation of the laser. When attached to the laser, the rigid support is spaced apart from the laser tube to allow for the adjustment of the angular positioning of the optical element. Furthermore, the aperture and optical element are disposed transverse to the optical axis and are aligned with the optical axis. Adjustment of the adjustable mounting devices changes the angular position of the optical element relative to the optical axis.

51 Claims, 4 Drawing Sheets

U.S. PATENT DOCUMENTS

| | | | |
|---|---|---|---|
| 4,686,685 A | * 8/1987 | Hoag | |
| 4,744,091 A | 5/1988 | Gorisch et al. | 372/107 |
| 4,746,201 A | 5/1988 | Gould | 350/394 |
| 4,769,824 A | 9/1988 | Seki | 372/107 |
| 4,891,818 A | 1/1990 | Levatter | 372/57 |
| 5,268,923 A | 12/1993 | Welsch et al. | 372/107 |
| 5,319,663 A | 6/1994 | Reid et al. | 372/59 |
| 5,373,523 A | 12/1994 | Fujimoto et al. | 372/103 |
| 5,438,587 A | 8/1995 | Kinley | 372/86 |
| 5,473,162 A | 12/1995 | Busch et al. | 250/339.08 |
| 5,585,641 A | 12/1996 | Sze et al. | 250/492.1 |
| 5,591,317 A | 1/1997 | Pitts, Jr. | 204/667 |
| 5,729,564 A | 3/1998 | Cullumber | 372/58 |
| 5,748,663 A | 5/1998 | Chenausky | 372/55 |
| 5,771,258 A | 6/1998 | Morton et al. | 372/57 |
| 5,857,775 A | 1/1999 | Vodzak et al. | 374/121 |
| 6,018,537 A | 1/2000 | Hofmann et al. | 372/102 |
| 6,151,346 A | 11/2000 | Partlo et al. | 372/38.02 |
| 6,192,061 B1 | 2/2001 | Hart et al. | 372/107 |
| 6,208,674 B1 | 3/2001 | Webb et al. | 372/55 |
| 6,359,922 B1 | 3/2002 | Partlo et al. | 372/57 |
| 6,363,094 B1 | 3/2002 | Morton et al. | 372/58 |

OTHER PUBLICATIONS

Kodeda, et al., "A Gas Laser and a Dedusting Unit Thereof," US Application 09/511,649 filed Feb. 22, 2000 (Status: pending).

Strowitzki, "Dedusting Unit for a Laser Optical Element of a Gas Laser and Method For Assembling," US Application 09/510,667 filed Feb. 22, 2000 (Status: pending).

Strowitzki, et al., "Shadow Device for a Gas Laser," US Application 09/510,017 filed Feb. 22, 2000 (Status: pending).

Strowitzki, et al., "Modular Gas Laser Discharge Unit," US Application 09/510,538 filed Feb. 22, 2000 (Status: pending).

* cited by examiner

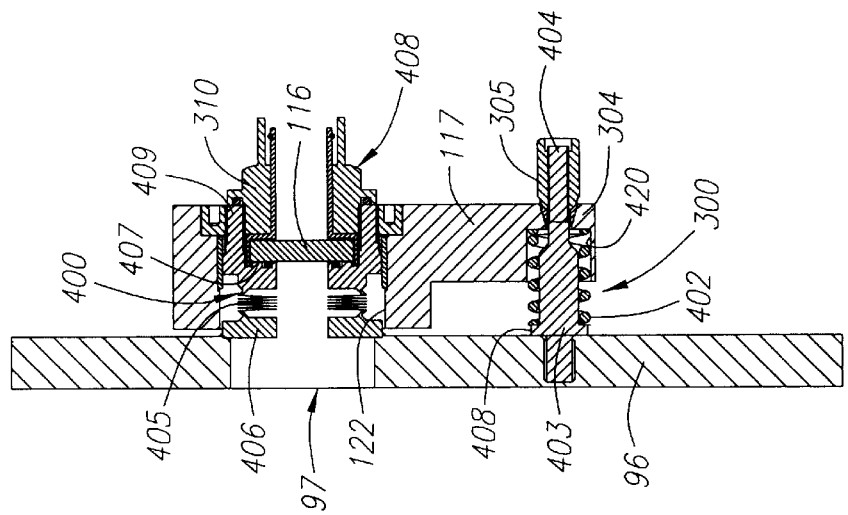
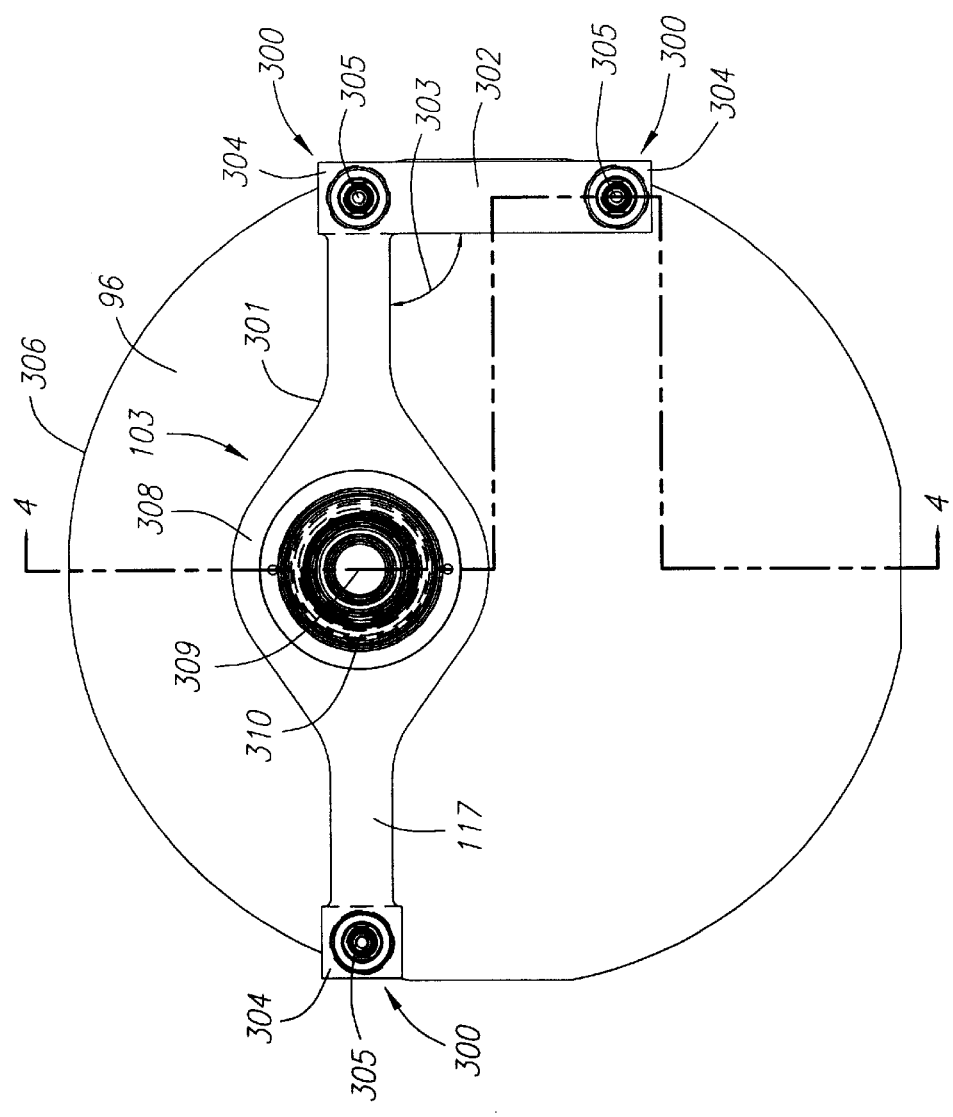
FIG. 4
FIG. 3

ADJUSTABLE MOUNTING UNIT FOR AN OPTICAL ELEMENT OF A GAS LASER

FIELD OF THE INVENTION

The invention relates to lasers, and more particularly to adjustable mounting units for the optical elements of gas lasers.

BACKGROUND OF THE INVENTION

Lasers have recently been applied to a large variety of technical areas, such as optical measurement techniques, material processing, medicine, etc.

Due to the special chemical, ablative, spectroscopic or diffractive properties of UV light, there is a big demand for lasers that generate laser beams having a short wavelength in the UV range.

Excimer lasers, such as the ones disclosed in U.S. Pat. Nos. 5,771,258 and 5,438,587, serve well as a laser for generating coherent, high intensity pulsed beams of light in the UV wavelength range.

The excimer lasers described in U.S. Pat. Nos. 5,771,258 and 5,438,587, are pulsed lasers. Pulsing is required in excimer lasers to allow sufficient time between pulses to replace the laser gas within the discharge region with fresh gas and allow the gas used for generating the previous pulse to recover before being used again for another gas discharge. In the discharge region (i.e., discharge gap), which in an excimer laser is typically defined between an elongated high voltage electrode and an elongated ground electrode which are spaced apart from each other, a pulsed high voltage occurs, thereby initializing emissions of photons which form the laser beam.

The laser beam is emitted along the extended ground electrode in a longitudinal direction of the laser tube. To achieve the desired amplification by stimulated emission of radiation, a resonator comprising a reflecting and a partially reflecting optical element disposed at opposite ends of the discharge gap is required. The laser beam leaves the tube through the latter.

If the reflective optical elements are provided outside the gas laser tube, a fully transparent window is provided in alignment with the discharge gap at each end of the tube to seal the tube, as can be seen in U.S. Pat. No. 5,438,587, for example. A mirror or other reflective optical element is then provided in axial alignment with one of the windows and its reflective side facing the window. A partially transparent, partially reflective mirror is positioned outside the tube so that it is aligned with and facing the other window. As a result, the faces of the two reflective optical elements are opposing one another and define a laser light resonator.

If the reflective optical elements are used to seal the tube, the mirror and the partially transparent, partially reflective mirror are integrated into the end walls of the tube at opposite ends of the discharge gap. As a result, no extra windows are required. For lasers emitting light in the ultraviolet range of the electromagnetic spectrum, extra windows have the disadvantage of significantly reducing the efficiency and increasing the operating costs, as the special window materials employed are expensive and deteriorate with use and time and need to be occasionally changed. In addition, the transparent windows closing the tube form extra optical elements resulting in extra losses and reflections on the surfaces. The latter can be removed by inclining the window at Brewster's angle as taught by U.S. Pat. No. 4,746,201, but invariably the laser output is reduced. Deterioration of the optical elements also cannot be entirely avoided, reducing output and giving rise to the need to replace the rather expensive optical elements after a certain time.

The reflective optical elements that form the resonator must be precisely positioned relative to one another to ensure optimal laser light output power, laser efficiency, and the quality of the laser beam. This is especially true with respect to the angular alignment of the reflective optical elements, not only with respect to each other, but also with respect to the laser tube. However, maintaining the appropriate angular alignment of the reflective optical elements is difficult in view of changes in the operating conditions, such as pressure or temperature of the gas and the temperature of the tube, the optical elements, and their supporting units. In addition, mechanical vibrations or shock to the laser may also affect the angular alignment of the reflective optical elements forming the laser resonator.

When the reflective optical elements are provided outside the laser tube, a very complex outer supporting structure for supporting the reflective optical elements must be provided. Such a supporting structure is very expensive and susceptible to damage. Furthermore, the length of the resonating path between the two opposing mirrors is longer than what is actually necessary. This reduces the output power of the laser, which in turn reduces the efficiency of the laser. In addition, the supporting structure is susceptible to deformation due to outer forces or thermal expansion. Such distortions may distort the angular alignment of the reflective optical elements, particularly the parallelism between the two opposing laser optical elements.

These disadvantages, which are attendant to external supporting structures, have lead to a demand to provide the reflective optical elements as an integral part of the laser tube. However, trying to provide the reflective optical elements as an integral part of the laser tube has caused a different set of problems.

Inside the laser tube, high gas pressures occur, thereby increasing the danger of deformation and damage of the rather sensitive laser optical element. The gas pressure is further increased as a result of the increasing temperature of the gas inside the laser tube caused by the emission of energy. This obviously makes the problem even worse. In addition, thermal expansion of the laser tube can generate a further distortion of the parallel disposition of the laser optical elements with respect to each other.

A mechanism for permitting the reflective laser optical elements to be adjusted with respect to each other is crucial, because light inside the resonator is reflected by the reflective optical elements forming the resonator numerous times. As a result, even a slight divergence from the ideal adjustment may cause a malfunction of the laser or at least a reduction of the laser light output power, and thus reduction in the efficiency of the laser and its beam quality.

A number of patents, including DE 3130399 A1, DBGM 297 15 466.4, U.S. Pat. No. 4,744,091, JP 61-047008, and DE 3710525 C2, teach the use of spacer bars or frames that surround the laser tube and support the reflective optical elements that form the laser's resonator. These spacer bars or frames also include adjustment mechanisms that permit the reflective optical elements to be adjusted relative to one another and the laser tube. Due to the spacing between the laser tube and these spacer bars or frames, these known mounting structures are not exposed to the operating conditions in the tube. Thus, the operating conditions of the laser do not tend to influence the position of the optical elements. However, such arrangements are difficult to manufacture and service. In addition, they are more prone to distortions resulting from external forces than a support structure for the resonator's optical elements that are directly coupled to the tube itself.

Thus, a need exists for an improved adjustable mounting unit for mounting the optical elements of a laser.

RELATED APPLICATIONS

The present invention may be used in conjunction with the inventions described in the patent applications identified below and which are being filed simultaneously with the present application:

| Docket No. | Title | Inventors | Filing Date | Serial or Patent No. |
| --- | --- | --- | --- | --- |
| 249/300 | Gas Laser Discharge Unit | Claus Strowitzki and Hans Kodeda | February 22, 2000 | 09/510,539 |
| 249/301 | A Gas Laser and a Dedusting Unit Thereof | Hans Kodeda, Helmut Frowein, Claus Strowitzki, and Alexander Hohla | February 22, 2000 | 09/511,649 |
| 249/302 | Dedusting Unit for a Laser Optical Element of a Gas Laser and Method For Assembling | Claus Strowitzki | February 22, 2000 | 09/510,667 |
| 249/303 | Shadow Device for A Gas Laser | Claus Strowitzki and Hans Kodeda | February 22, 2000 | 09/510,017 |
| 249/304 | Modular Gas Laser Discharge Unit | Claus Strowitzki and Hans Kodeda | February 22, 2000 | 09/510,538 |
| 250/002 | An Optical Element Holding and Extraction Device | Hans Kodeda and Helmut Frowein | February 22, 2000 | 09/510,666 |

All of the foregoing applications are incorporated by reference as if fully set forth herein.

SUMMARY OF THE INVENTION

An object of the present invention is to provide an adjustable mounting unit for an optical element of a gas laser in which it is possible to achieve an improved ability to adjust the position of the optical element while at the same time be able to mount the optical element to the laser tube. The ability to adjust the position of reflective optical elements that define the laser resonator is particularly important to achieving optimal performance from a gas laser.

In order to achieve this first object of the invention, an adjustable mounting unit for an optical element of a gas laser comprising a tube having a first end wall at one end and a second end wall at the other end is provided. The mounting unit comprises a rigid support structure including an aperture, an optical element mounted within the aperture, and at least three adjustable mounting devices to attach the support structure to the laser tube. Preferably the mounting points are selected so that they are displaced in an axial direction by substantially the same amount due to dimensional changes in the laser that occur during operation of the laser. When the adjustable mounting unit is attached to the laser, the rigid support is spaced apart from the end wall of the laser to allow for the adjustment of the angular positioning of the optical element. Furthermore, the aperture and optical element are disposed transverse to the optical axis and are aligned with the optical axis. Adjustment of the adjustable mounting devices changes the angular position of the optical element relative to the optical axis.

In a preferred embodiment of the invention, the adjustable mounting unit further comprises a gas-tight flexible tube element which is used to form a gas-tight seal between the laser tube and the optical element disposed in the aperture of the rigid support structure. Preferably, the flexible tube comprises a base end, an optical element receiving end, an optical element receiving surface within said flexible tube element proximate to the receiving end, and a flexible section interposed between the base end and the receiving surface. The flexible section may comprise, for example, a bellows. The base end of the flexible tube is hermetically attached around the port to the first end wall so that the optical axis of the laser passes through the flexible tube element. The exterior surface of the optical element receiving end is engaged with the aperture wall in the rigid support. Further, the optical element is received by the optical element receiving surface within the flexible tube element and a hermetic seal is formed between the optical element and the optical element receiving surface.

Thus, by employing the flexible tube element as described above, a gas tight chamber may be formed between the end wall and the optical element. This in turn permits the laser to be designed without using a fully transparent lens in the end wall to seal the laser, thereby reducing the number of optical elements through which the laser light must pass.

Preferably the optical element is symmetrically disposed between an even number of the adjustable mounting devices. For example, if the even number of fixation points is two, the center of the optical element preferably falls on a line that bisects the line connecting the two fixation points at their midpoint, and more preferably it is positioned close to the center of the line connecting the two fixation points. The remaining fixation points can be used to tilt the support, and thereby adjust the optical element and the laser unit.

The rigid support structure may comprise a solid plate or an angular structure having a first arm and a second arm that enclose an angle. Preferably the enclosed angle is 90°.

With the adjustable mounting unit of the present invention, it is now possible to achieve very exact adjustments of the optical elements of a laser, even in a situation where the optical elements are used to provide a gas seal. Furthermore, the adjustable mounting unit of the present invention is very simple and thus cheap. As a result, with the adjustable mounting unit of the present invention, it is no longer necessary to provide a complex outer support mechanism to support a laser optical element outside the laser tube if adjustability is desired.

A second object of the invention is to provide a gas laser with an adjustable mounting unit for an optical element. In particular, it is desired to provide a gas laser with an adjustable mounting unit for an optical element that is capable of being adjusted with improved precision.

To this end, a gas laser is provided that comprises a tube having a first end wall at one end and a second end wall at the other end. The tube defines a cavity for containing a laser gas therein and includes a port in the first end wall. The laser further comprises an optical axis extending longitudinally through the tube and passing through the port. The optical axis is the axis along which the laser light resonates in the laser. A rigid support structure that includes an aperture is mounted to the laser tube so that the optical axis passes through the aperture. An optical element is mounted within the aperture. Preferably the optical element is either a fully reflective or partially reflective, partially transmissive mirror so that it comprises one of the mirrors of the laser resonator. At least three adjustable mounting devices are used to attach the support structure to the laser tube.

To ensure that the laser remains properly adjusted at all times, preferably the mounting points. are selected so that they are displaced in an axial direction by substantially the same amount due to dimensional changes in the laser occurring during the operation of the laser. When attached, the rigid support is spaced apart from the end wall of the laser to allow for the adjustment of the angular positioning of the optical element. Furthermore, the aperture and optical element are disposed transverse to the optical axis and are aligned with the optical axis. Adjustment of one of the three adjustable mounting devices changes the angular position of the optical element relative to the optical axis.

In a preferred embodiment of the invention, the laser further comprises a gas-tight flexible tube element that is used to form a gas-tight seal between the laser tube and the reflective optical element. Preferably, the flexible tube comprises a base end, an optical element receiving end, an optical element receiving surface within said flexible tube element proximate to the receiving end, and a flexible section interposed between the base end and the receiving surface. The flexible section may comprise, for example, a bellows. The base end of the flexible tube is hermetically attached to the first end wall around the port so that the optical axis of the laser passes through the flexible tube element. The exterior surface of the optical element receiving end is engaged with the aperture wall in the rigid support. Further, the optical element is received by the optical element receiving surface within the flexible tube element and a hermetic seal is formed between the optical element and the optical element receiving surface.

Thus, by employing the flexible tube element as described above, a gas tight chamber may be formed between the end wall of the laser and the optical element. This in turn permits the laser to be designed without using a fully transparent lens in the end wall to seal the laser, thereby reducing the number of optical elements through which the laser light must pass.

Preferably the optical element is symmetrically disposed between an even number of the adjustable mounting devices. For example, if the even number of fixation points is two, the center of the optical element preferably falls on a line that bisects the line connecting the two fixation points at their midpoint, and more preferably it is positioned close to the center of the line connecting the two fixation points. The remaining fixation points can be used to tilt the support, and thereby adjust the optical element and the laser unit.

The rigid support structure may comprise, for example, a solid plate or an angular structure having a first arm and a second arm that enclose an angle. If an angular structure is used, preferably the enclosed angle is 90°. The arms, i.e. the first arm and the second arm, may have different lengths. Preferably, however, the first arm of the rigid support structure is about twice as long as the second arm, and the aperture is formed in the first arm. In a further preferred embodiment of the invention, mounting devices are preferably arranged at the end portions of the arms.

The adjustable mounting devices employed in connection with the present invention preferably each comprise a stud bolt having a first threaded end, a second threaded end, and a body portion interposed between the first threaded end and the second threaded end. The first threaded end is slideably received in a hole in the support structure and extends through the hole. The second threaded end is used to attach the support structure to the laser. An adjusting nut is then threaded onto the first threaded end, and a biasing element is provided to bias the support structure away from the second threaded end of the stud bolt and toward the adjusting nut.

Therefore, with the gas laser of the present invention, it is now possible to achieve very exact adjustments of the optical elements of the laser, even in a situation where the optical elements are used to provide a gas seal. Furthermore, the adjustable mounting unit of the present invention is very simple and thus cheap. As a result, with the adjustable mounting unit of the present invention, it is no longer necessary to provide a complex outer support mechanism to support a laser optical element outside the laser tube if precision adjustability is desired. Furthermore, gas lasers according to the present invention are more efficient because they have a shorter resonance distance. In addition, manufacturing costs are less with gas lasers according to the present invention than a gas laser according to the prior art because the complex supporting mechanisms used in the typical prior art devices are not required with the present invention.

With the present invention it is now also possible to provide a stable support arrangement for the optical elements of a gas laser that is mounted to the laser tube itself and which keeps the optical elements in the appropriate alignment and position independent of the operating conditions of the laser.

The present invention is especially well suited for use in excimer lasers because excimer lasers operate under a very high pressures and temperatures. For example, excimer lasers typically operate at a pressure of about 6 bar and a temperature of up to 100° C. or more. With the present invention, however, it is possible to cope with these demanding conditions and provide a precise adjustment of the optical elements of the laser. Furthermore, these adjustments will not become distorted during use of the laser as a result in variations in the operating conditions within the laser tube. Indeed, because the optical element is supported indirectly by the tube edge in the devices according to the present invention, any bending, curving and/or deflecting of the front portion of the laser tube, due to changes in temperature or pressure in the tube, for example, will not affect the alignment of the reflective optical elements mounted in the adjustable mounting structure.

Preferred embodiments of the present invention will now be described in detail in connection with the accompanying drawings.

Other objects, features and advantages of the invention will become apparent to those skilled in the art from the following description of the preferred embodiment taken together with the drawings.

BRIEF DESCRIPTION OF THE DRAWINGS

FIG. 3 is a plan view of an adjustable mounting unit according to a preferred embodiment of the invention; and FIG. 4 is a cross-sectional view of the adjustable mounting unit shown in FIG. 3 taken along Line 4—4.

DETAILED DESCRIPTION OF A PREFERRED EMBODIMENT OF THE INVENTION

Figure 1:
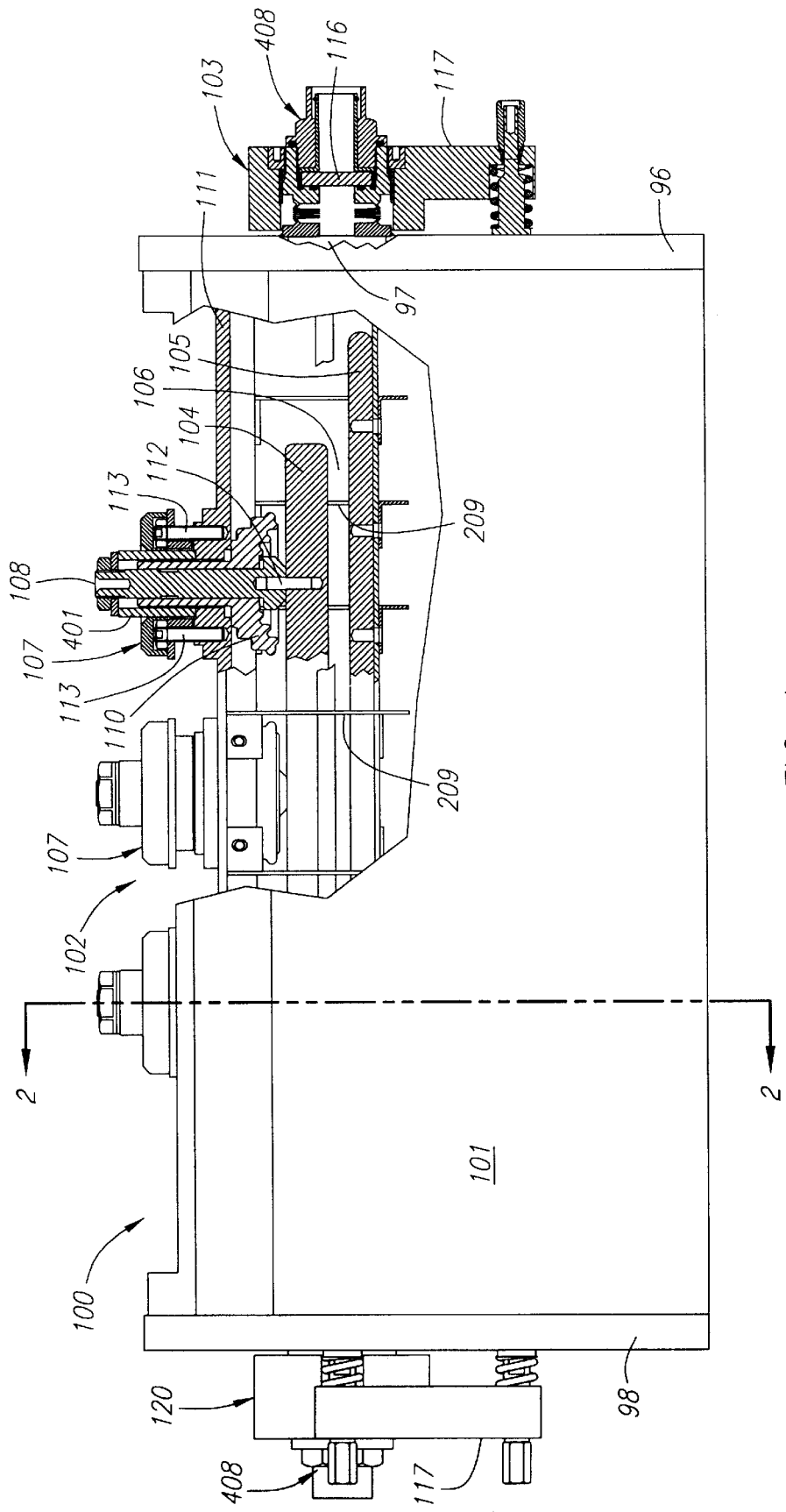
FIG. 1 is a partial cut-away view of a gas laser in which an adjustable mounting unit for an optical element according to the present invention is employed.
Figure 2:
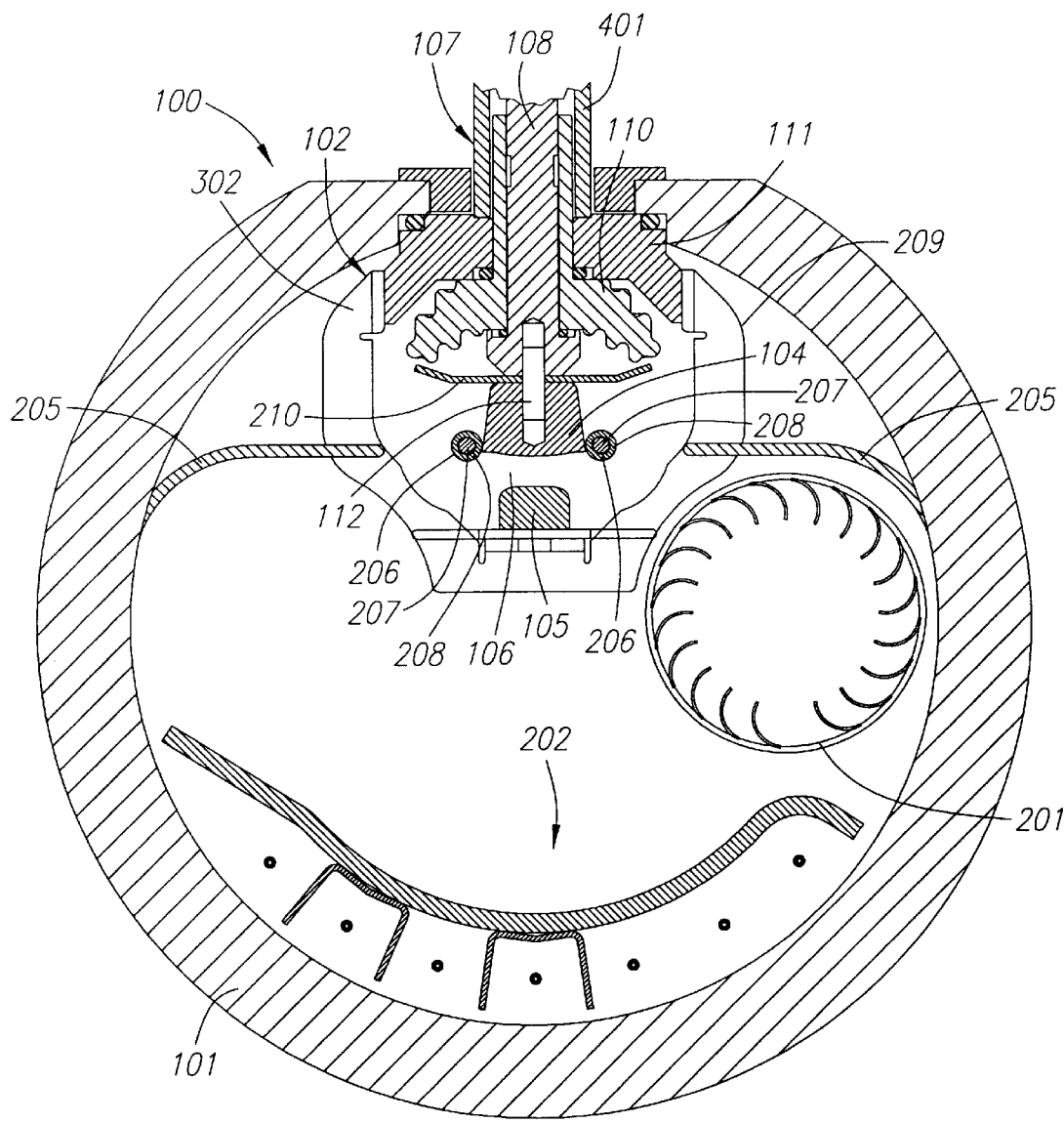
FIG. 2 is a cross-sectional view of the gas laser in FIG. 1 along Line 2—2.

A gas laser 100 in which the adjustable mounting unit for an optical element of a gas laser of the present invention may be used is illustrated in FIGS. 1 and 2. Gas laser 100 is preferably an excimer laser. However, as will be apparent to those skilled in the art, the present invention may also be used in connection with other gas lasers.

Gas laser 100 preferably comprises a tube 101, a discharge unit 102, a circulation means 201, and adjustable mounting units 103, 120 for the laser's optical elements.

Laser tube 101 includes a first end wall 96 at one end and a second end wall 98 at the other end. Laser tube 101 defines a laser cavity for containing the desired laser gas. As is known in the art, gas laser 100 may also comprise means for cooling the laser gas, such as a gas cooler, within laser tube 101.

The circulation means 201 is optional and may comprise, for example, a fan or any other means known for circulating lasing gases in gas lasers.

The discharge unit 102 is mounted into the tube 101 and comprises a high voltage electrode 104 and the ground electrode 105. The high voltage electrode 104 and the ground electrode 105 are spaced apart from each other, thereby defining a gas discharge gap 106. A high voltage is applied to the high voltage electrode 104 via a plurality of high voltage ducts 107, which carry the high voltage electrode 104. Each high voltage duct 107 comprises a conductive core 108 and an insulator element 110 arranged around the conductive core 108. In addition, each high-voltage duct 107 includes a cylindrical shield 401, which is disposed around a portion of the insulator element 110 and which is preferably comprised of an insulator material such as ceramic. Each high voltage duct 107 is attached to the high voltage electrode 104. The high voltage ducts may be attached to the high voltage electrode using any suitable fastener. In the present embodiment, a double threaded stud 112 is used to attach electrode 104 to each conductive core 108 of each duct 107.

Furthermore, discharge unit 102 is provided with an elongated electrode plate 111. The electrode plate 111 includes holes, through which the high voltage ducts 107 extend so as to be connected to the high voltage electrode 104. Each high voltage duct 107 is fixed to the electrode plate 111 by an attachment means, such as bolts 113. Those skilled in the art will appreciate, however, that any suitable attachment means may be used to fix ducts 107 to electrode plate 111.

The insulator elements 110 are preferably made of a ceramic material. Optionally, however, they may be made from other insulative materials, including, for example, a fluoride material. They preferably have a shape that conically expands towards the high voltage electrode 104 and comprise a corrugated surface, so as to increase a creepage path extending along said surface. This helps to prevent surface flashover between the high voltage electrode 104 and the grounded electrode plate 111.

As illustrated in FIG. 2, discharge unit 102 also preferably comprises a shadow plate 210 disposed between the gas discharge gap 106 and the insulator element 110 for protecting the insulator element 110 against the corrosive effect of the laser gas and of the laser radiation. Shadow plate 210 is preferably made out of a metal, such as aluminum.

The excimer laser 100 may be, for example, a pulsed fluorine gas ($F_2$) excimer laser with a wavelength of about 157 nanometers. This means that fluorine gas is used for generating the laser beam. However, as those skilled in the art will appreciate, any of the known excimer laser gases may be used in connection with the present invention, as well as any of the other lasing gases for gas lasers.

By applying a high voltage pulse on the order of 20 kV to the high voltage electrode 104, the laser gas (e.g., fluorine gas) and additionally helium, neon and/or argon gas as a buffer gas in the discharge gap 106 generate a laser beam which is emitted through the laser optical system comprising a front adjustable mounting unit 103 and a rear adjustable mounting unit 120. As those skilled in the art will appreciate, the laser resonating path, which is also referred to as the optical axis, for the laser 100 is in axial alignment with the gas discharge gap 106.

Front and rear adjustable mounting units 103, 120 each include an optical element 116. Preferably optical elements 116 are reflective optical elements. However, as those skilled in the art will appreciate, optical elements 116 may also comprise fully transparent windows. If optical elements 116 comprise transparent windows, then the reflective optical elements forming the laser resonator would be mounted on a separate mounting structure as is known in the art. Optical elements 116 in the front and rear adjustable mounting units are disposed in the laser resonating path and have one side exposed to the laser cavity formed by tube 101.

If the optical elements 116 are reflective, then optical element 116 in the front adjustable mounting unit 103 preferably comprises a partially reflective, partially transmissive mirror so that it will emit the laser beam from the front end of the laser. On the other hand, the optical element 116 of the rear adjustable mounting unit 120 preferably comprises a totally reflective mirror rather than a partially reflective mirror.

A port 97 is provided in each of the end walls 96, 98. Each of the ports is aligned with the resonating path or optical axis of the laser. In addition, the optical elements 116 are aligned with their respective port 97 so that laser light resonating in the laser can impinge upon the optical elements 116.

Preferably adjustable mounting unit 120 is similar in structure to the adjustable mounting unit 103 employed at end wall 96. However, laser 100 may also be designed so that the rear optical element 116 is mounted in alignment with the resonating path fully within laser tube 101. For example, rear optical element 116 could be mounted on the inner wall of the rear end wall 98, or, alternatively, on the exterior wall of the rear end wall so that it is covering port 97 formed therein. If optical element 116 is provided on the exterior wall of rear end wall 98, a flange structure may be used to mount the optical element as is known in the art.

FIG. 2 is a cross-sectional view along line 2—2 of the excimer laser 100 shown in FIG. 1. As can be seen in FIG. 2, the excimer laser 100 preferably further includes a circulating means 112, such as a fan, for circulating the excimer laser gas through the discharge gap 106 and an optional dedusting unit 202 for dedusting the gas flow through the tube 101. The dedusting unit comprises high voltage wires 203, separated from each other by U-shaped channels 204 extending along the tube 101. Furthermore, two guiding plates 205, which are elongated in the longitudinal direction of the tube 101 are preferably provided for guiding the gas flow through discharge gap 106 and a portion of such gas into dedusting unit 202. After exiting dedusting unit 202, the gas returns to fan 201 to be recirculated through the laser

101. A detailed description of a suitable dedusting unit 202 for use in connection with the present invention is provided in a concurrently filed application bearing Ser. No. 09/510, 539, which is hereby incorporated by reference. The filing details of this application are provided above.

The ground electrode 105 is preferably carried by, or mounted to, the electrode plate 111 via a plurality of flow guides 209. Flow guides 209 are preferably conductive so that they electrically couple the ground electrode 105 to the electrode plate 111, which in turn electrically couples the ground electrode to the laser tube 101, which is held at ground potential.

Adjacent to the high voltage electrode 104, two pre-ionizers 206 are provided, which serve to pre-ionize the laser gas to ensure greater homogeneity of the gas discharge in the discharge gap 106.

The pre-ionizers 206 are preferably corona-type pre-ionizers and extend substantially parallel to said high voltage electrode. The pre-ionizers 206 have a coaxial shape with a conductive core 207 surrounded by a tube shaped insulator 208.

The corona-type pre-ionizers can be mounted immediately adjacent to the high voltage electrode. In particular, as shown in FIG. 2, the corona-type pre-ionizers should be mounted at the opposing edges of the high voltage electrode so that it is disposed adjacent the electrode face of the high voltage electrode facing the ground electrode.

Although corona-type pre-ionizers are preferred for use as pre-ionizers 206 in connection with the present invention, those skilled in the art will recognize that any of the pre-ionizers known in the art may be used. The insulator of the pre-ionizers is preferably a ceramic material, such as alumina. It can also be a fluoride material. Alternatively, any other kind of known pre-Ionizer can be used. The pre-ionizers are not necessary for the discharge unit to work. Indeed, excimer lasers were known before the invention of pre-ionizers. Pre-ionization, however makes the gas discharge between the high voltage electrode and the ground electrode more homogeneous and thus more reliable.

Discharge unit 102 is more fully described in concurrently filed applications bearing Ser. Nos. 09/510,539 and 09/510,538, which are hereby incorporated by reference as if fully set forth herein. The filing details of these applications are provided above.

Although high voltage electrode 104 and ground electrode 105 are preferably mounted on an electrode plate to form a modular discharge unit 102 as described above, the present invention is not limited to use in gas lasers with modular discharge units. Those skilled in the art will appreciate, a variety of techniques have been used for mounting an elongated high voltage electrode and an elongated ground electrode in a parallel, spaced-apart relationship in a gas laser tube so as to define a gas discharge gap therebetween and hence the laser resonating path and optical axis. Those skilled in the art will also appreciate that these other techniques may be satisfactorily employed in connection with the present invention. Therefore, gas lasers according to the present invention merely need an optical axis or resonating path that longitudinally extends through the laser tube. How the discharge gap or optical axis is formed is of less importance.

An adjustable mounting unit 103 for an optical element of a gas laser according to the present is now described in connection with FIGS. 3, 4 and 5.

The adjustable mounting unit 103 comprises a rigid support 117 having an aperture defined by aperture wall 122. Optical element 116 is mounted within the aperture. First, second, and third adjustable mounting devices 300 are provided to attach the support structure to the laser at three separate points. Preferably the mounting points are selected so that they are displaced in an axial direction by substantially the same amount due to dimensional changes in the laser that occur during operation of the laser as a result of changes in temperature and pressure. Thus, to minimize deviations in the angular alignment of the optical element during the operation of the laser, preferably the mounting points are located proximate to the peripheral edge 306 of the tube as shown in FIG. 3. By selecting mounting points that are as close to the edge 306 of tube 101 as possible, any bending, curving and/or deflecting of the end wall 96, due to changes in temperature or pressure in the tube 101, will not affect the alignment of the reflective optical elements mounted on the adjustable mounting unit.

Using the discharge unit designs described in concurrently filed applications bearing Ser. Nos. 09/510,539 and 09/510,538 may be particularly advantageous in connection with the present invention. The discharge unit designs described in these concurrently filed applications permit the laser to be designed without using a large insulating plate across the top of the laser tube to seal the tube. Instead, coaxial ducts 107 are used that extend through the laser tube 101. As a result, laser tube 101 will tend to thermally expand more uniformly in the axial direction over its entire circumference.

Further, in order to ensure that the mounting points are displaced in an axial direction by substantially the same amount during operation of laser 100, external and localized heat sources and sinks should be kept away from the laser tube 101. This will help keep the thermal expansion as uniform as possible at all of the mounting points on the tube 101.

When the adjustable mounting unit 103 is attached to the laser tube, the rigid support 117 is spaced apart from the end wall 96 of the laser to allow for the adjustment of the angular positioning of the optical element 116. Furthermore, the aperture and optical element are disposed transverse to the optical axis and are aligned with the optical axis. As a result, adjustment of the adjustable mounting devices 300 changes the angular position of the optical element relative to the optical axis.

As illustrated in FIG. 3, rigid support structure 117 preferably comprises an L-shaped structure comprising a first arm 301 and a second arm 302 integrally meeting at one of their end portions 304. First arm 301 is preferably longer than the second arm 302. Preferably, first arm 301 is about twice as long as the second arm 302 and the aperture is formed in the center of the first arm 301. The first arm 301 and the second arm 302 enclose an angle 303 therebetween. In the present embodiment, the enclosed angle 303 is 90°, as this will enable the easiest and most accurate adjustments of the optical elements. However, those skilled in the art will appreciate that a wide variety of other angles are also possible. Those skilled in the art will also appreciate that rigid support structure 117 may take on a variety of other forms. For example, rigid support structure 117 may comprise a T-shaped structure or a solid plate in the form of a triangle with adjustable mounting devices 300 located at each of the corners of the triangle. Similarly, rigid support structure 117 may comprise a square or circular plate.

Although three adjustable mounting devices 300 are used in connection with the illustrated embodiment, those skilled in the art will recognize that in other embodiments of the invention additional adjustable mounting devices 300 may be used.

Using an L-shaped rigid support structure 117 as illustrated in FIG. 3 leads to a very easy, symmetric adjusting operation for the optical element 116. This is in part because the arms of the rigid support 117 essentially form an eccentric lever relative to the optical element and the front end wall 96 of the tube. It is also due in part to the fact that the first arm 301 and the second arm 302 are integrally attached to one another at one of their end portions 304. As a result, arms 301 and 302 share a common adjustable mounting device 300 for mounting the rigid support structure 117 to the laser tube.

When one of the two non-shared adjustable mounting devices 300 is used for adjusting the optical element 116, the optical element 116 is essentially rotated only about the x-axis or the y-axis, assuming that the arms 301, 302 form a coordinate system with its origin in the center of the shared adjustable mounting device 300. In other words, the x-axis is the axis in parallel to the first arm 301 and the y-axis is the axis in parallel to the second arm 302.

Thus, the adjustable mounting units 103, 120 according to the present invention provide a very symmetric and easy way for the reflective optical elements 116, which make up the laser resonator, to be adjusted relative to the optical axis.

The adjustable mounting devices 300 according to the present invention preferably comprise a stud bolt 403, a biasing element 402, such as a coil spring, and an adjusting nut 305. As illustrated in FIG. 4, each stud bolt 403 preferably comprises two threaded ends and a body portion interposed between the two threaded portions. Preferably, as illustrated, the body portion is larger in diameter than the two threaded ends. The first threaded end 404 of stud bolt 403 is slideably received through a hole in the rigid support structure 117 so that the first threaded end extends through the support structure. The second threaded end is used to attach the support structure 117 to the end wall 96 of laser tube 101 (or end wall 98 in the case of adjustable mounting unit 120). Coil spring 402 may be slideably carried on the body portion of stud bolt 403, and adjusting nut 405 is threaded onto the first threaded end 404 of the stud bolt 403 extending through the rigid support structure. As a result, the support structure 117 is slideably interposed between the adjusting nut 405 and a first end of the coil spring. When the threaded end of the stud bolt is attached to the laser tube, spring 402 biases the support structure 117 away from the second threaded end of the stud bolt 403 toward the adjusting nut 305.

Preferably stud bolt 403 further comprises a spring stop 408 disposed on the body portion of the stud bolt proximate to the second threaded end. The second end of coil spring 402 then abuts the spring stop 408 so that the coil spring is interposed between the spring stop and the rigid support structure 117.

Recesses 420 are preferably provided, as shown in FIG. 4, in the rigid support structure 117 for receiving the first end of each of the coil springs 402 of the adjustable mounting devices 300. In the present embodiment, recesses 420 are provided at each end portion 304 of the first arm 301 and the second arm 302. Thus, each recess 420 receives one of the coil springs 402, which are carried on a corresponding stud bolt 403.

Adjusting nuts 305, springs 402, and the stud bolts 403 may be used to mount the rigid support structure 117 on a peripheral edge 306 of the end wall 96 of the laser tube 101 as shown in FIG. 4, or, alternatively on end wall 98.

Preferably the adjustable mounting units 103, 120 according to the present invention further comprise a gas-tight flexible tube element 400 which is used to form a gas-tight seal between one of the end walls 96, 98 of laser tube 101 and the reflective optical element 116. Preferably, the flexible tube element comprises a base end 406, an optical element receiving end 409, an optical element receiving surface 407 within the flexible tube element proximate to the receiving end, and a flexible section 405 interposed between the base end 406 and the receiving surface 407. The flexible section 405 may comprise, for example, a bellows.

The base end 406 of the flexible tube is hermetically attached to end wall 96 around the port 97 so that the optical axis of the laser passes through the flexible tube element. If an adjustable mounting unit is also provided at end wall 98, then the base 406 of a second flexible tube element is hermetically attached to the end wall 98. The base end 406 is preferably hermetically attached to the appropriate end wall by welding or brazing. The exterior surface of the optical element receiving end 409 is engaged with the aperture wall 122 in the rigid support 117. Further, the optical element 116 is received by the optical element receiving surface 407 within the flexible tube element and a seal 412, such as an O-ring is provided between the optical element 116 and the optical element receiving surface 407 to help form a hermetic seal between the two.

To ensure that the exterior surface of the optical element receiving end 409 is frictionally locked against aperture wall 122, a locking ring 411 having internal threads 417 may be threadably engaged onto mating threads provided on the exterior surface of the optical element receiving end 409 of the flexible tubular element 400. Locking ring 411 is threaded down onto the receiving end 409 until it abuts rigid support 117. Once locking ring 411 is pressing against rigid support 117, further rotation of the locking ring in the direction of tightening draws the flexible tubular clement 400 into the aperture and into contact with the aperture wall 122. By tapering the aperture wall 122 so that it narrows or tapers toward the side facing away from the laser, the frictional engagement of the optical element receiving end and the aperture wall can be further improved.

Adjustable mounting units 103, 120 also preferably comprise an optical element retainer 310. Retainer 310 retains or secures the optical element 116 against the optical element receiving surface 407, as well as seal 412, thus helping maintain a gas-tight seal between the optical element and the optical element receiving surface 407. To ensure that optical element 116 is securely held in place when the laser gas contained within the laser tube is under pressure, retainer 310 is engaged with the optical element receiving end 409 of the flexible tubular element 400. In the present embodiment, retainer 310 comprises an externally threaded sleeve that is threadably engaged with the internal surface of the optical element receiving end 409. As a result, the optical element 116 is interposed between the retainer 310 and optical element receiving surface 407, thereby improving and maintaining the seal formed between the optical element and the receiving surface.

Thus, by employing the flexible tube element 400 as described above, the optical element 116 may be used to seal the laser tube 101, while still allowing the optical element to be angularly adjusted. This in turn permits the laser to be designed without using a fully transparent lens mounted directly on the end wall 96 or 98 to seal the laser, thereby reducing the number of optical elements through which the laser light must pass.

Preferably the optical element 116 is symmetrically disposed between an even number of the adjustable mounting devices 300. For example, if the even number of fixation points selected is two, then the center of the optical element 116 preferably falls on a line that bisects the line connecting the two fixation points at their midpoint, and more preferably it is positioned close to the center of the line connecting the two fixation points as illustrated in FIG. 3. The remaining fixation points can be used to tilt the support, and thereby adjust the optical element and the laser unit.

A seal 414, such as an O-ring, may also be provided between an annular shoulder 415 of the retainer sleeve 310 and the optical element receiving end 409 of the flexible tubular element. The use of seal 414 is advantageous in situations where the laser beam delivery area 412 between optical element 116 and the work piece must be evacuated or, alternatively, filled with a gas, such as nitrogen, to permit the laser beam to be properly transmitted to the work piece.

In a particularly preferred embodiment of the present invention, retainer 310 forms part of an optical element holding and extraction device 408. Optical element holding and extraction device 408 is used to help minimize the potential of damaging the optical element 116 during maintenance and installation. The optical element holding and extraction device 408 comprises retainer 310 and an optical element holder 422. Optical element holder 422 comprises a gripping portion 418 that grips the optical element and a tubular extraction portion 419 attached to the gripping portion.

Figure 5:
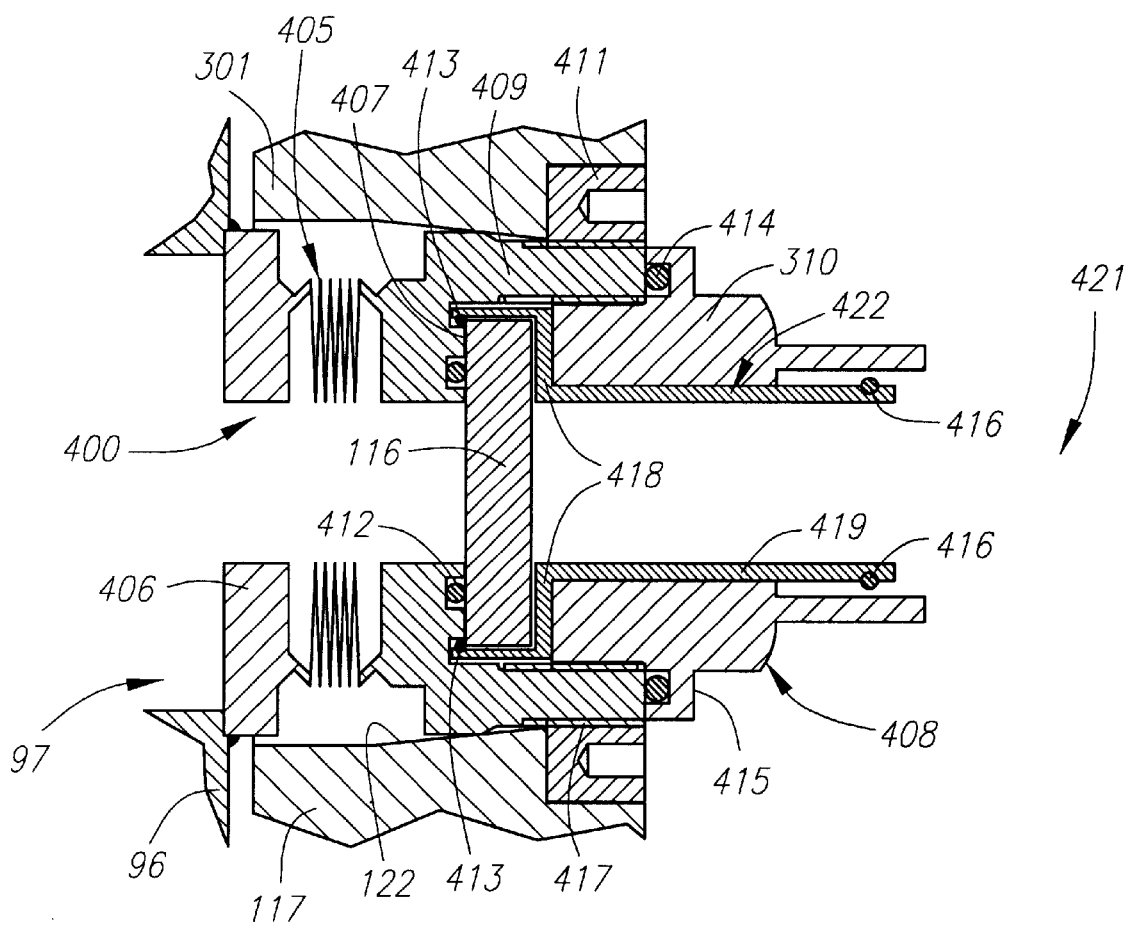
FIG. 5 is an enlarged cross-sectional view of a portion of the adjustable mounting unit shown in FIG. 4.

As can be seen from FIGS. 4 and 5, the gripping portion 418 is in a gripping arrangement around the peripheral edge of optical element 116. To achieve this gripping arrangement, the gripping portion 418 preferably comprises an annular clip in which the optical element is received and a stop 413. Stop 413 is provided on the inner diameter of the annular clip and abuts the laser side of optical element 416 to help lock the optical element in the annular clip of the gripping portion 418. Stop 413 may comprise, for example, a snap ring or other locking mechanism such as a detent. Thus, with the aid of stop 413, the optical element 116 is prevented from falling out of the gripping portion 418 when the optical element holding and extraction device 408 is detached from the adjustable mounting structure 103 or 120. This is true even though O-ring seal 412 tends to stick to the mating face of the optical element 116 and thus tends to pull the optical element toward the laser tube 101.

A further advantage of employing the optical element holding and extraction device 408 in the adjustable mounting unit of the present invention is that the gripping portion 418 includes a shoulder that is interposed between the optical element 116 and retainer sleeve 310. As a result, when retainer sleeve 310 is screwed into optical element receiving end 409 of tubular element 400, the retainer sleeve does not scratch the optical element because it does not come in direct contact with the optical element.

The tubular extraction portion 419 is connected at one end to the gripping portion 418. The axis of the tubular extraction portion extends longitudinally in a direction parallel to the optical axis of the laser. The tubular extraction portion is preferably dimensioned so that the exterior wall of the extraction portion slideably abuts the interior wall of retainer sleeve 310. As a result, the tubular extraction portion is slideably engaged with the inner diameter wall of the retainer sleeve. Furthermore, tubular extraction portion 419 is preferably longer than the corresponding length of the portion of retainer 310 that is slideably engaged with the tubular extraction portion.

A catch 416 is also preferably provided on the exterior surface of tubular extraction portion of the optical element holder 422. Catch 416 may be, for example, a snap ring or a detent. Catch 416 is preferably provided proximate the end of tubular extraction portion 419 that is opposite the end connected to the gripping portion 418.

When retainer 310 is detached from the optical element receiving end 409, the retainer 310 may be slid along the surface of the tubular extraction portion 419 of the optical element holder 422 until it comes in contact with catch 416. Continued pulling on the retainer 310 in a direction away from the laser causes a transfer of force via the catch 416 to the tubular extraction portion 419, and gripping portion 418 to the optical element 416. As a result, optical element 416 may be readily and safely removed from the optical element receiving surface 407 with significantly reduced risk for potential damage.

Another advantage of using the optical element holding and extraction device 408 in the adjustable mounting unit of the present invention is that it permits the optical element 116 to be secured to the optical element receiving surface 407 in any desired rotational position. In other words, the optical element 116 may be rotated around a rotational axis extending parallel to the emitted laser beam, and thus the optical axis, by any angle. In addition, the rotation may be achieved without first emptying the laser gas.

When the optical element 116 is to be rotated, retainer 310 is loosened. Retainer 316 is loosened, however, only enough to permit optical element holding and extraction device 408 to be rotated while making sure that the optical element 116 remains gas tightly sealed to the receiving surface 407. Once retainer 310 is sufficiently loosened, the optical element holding and extraction device 408 may be rotated by grasping onto the tubular extraction portion 419 and rotating it in the desired direction. A pair of pliers may be used to help rotate device 408 if needed. Thus, although optical element 116 remains gas-tightly sealed to the receiving surface 407, it may be rotated, without being damaged or having to empty and then refill the laser gas in the laser, simply by rotating holder 422. The rotation of a laser optical element 116, therefore, may be accomplished in a very simple manner.

The ability to rotate the optical element without having to empty the laser gas first is desirable from a laser maintenance standpoint. The laser light tends to blacken the optical element 116 in its central portion. Thus, by being able to rotate the optical element periodically, a portion of the optical element that is not as blackened may be rotated in front of the point where the laser beam strikes the optical element, thereby restoring some of the laser's efficiency. This of course assumes that the laser beam impinges upon the optical element at a point that is eccentric to the rotational axis of the optical element. However, those skilled in the art will be able to readily design a laser in which the laser beam strikes the optical element slightly off center.

From the foregoing, it should be readily understood that according to the present invention, the retainer is preferably an externally threaded sleeve and the optical element is preferably round. The optical element holder is also preferably formed so that it is rotationally symmetrical. Finally, the optical element holder, the retainer and the optical element preferably share a common central axis of rotation.

Once the optical element is rotated through a desired angle, the retainer 310 is tightened to ensure that a gas-tight seal is maintained between the optical element 116 and receiving surface 407.

Though according to the preferred embodiment, the laser was described as using fluorine gas ($F_2$) as a laser gas and helium, neon and/or argon gas as a buffer gas, the laser gas may be selected from the group consisting of Ar and/or $F_2$, Xe and/or $F_2$, Xe and/or $Br_2$, Hg and/or $Br_2$, Hg and/or $Cl_2$, Xe and/or $Cl_2$, Kr and/or $F_2$.

It should be further understood that the invention is suitable for any gas laser, though in the preferred embodiment, an excimer laser is described as an example.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention, which is set forth in the following claims.

We claim:

1. An adjustable mounting unit for an optical element of a gas laser comprising a tube having a first end wall at one end and a second end wall at the other end and an optical axis extending longitudinally through the tube, wherein the tube defines a cavity for containing a laser gas therein, and the first end wall includes a port through which the optical axis of the laser passes, said mounting unit comprising:
    a rigid support structure, said support structure including an aperture;
    an optical element mounted within said aperture;
    a first, a second, and a third adjustable mounting device to attach said support structure to a first, second, and third mounting point on the laser, respectively, that are displaced in an axial direction by substantially the same amount due to dimensional changes in the laser occurring during the operation of the laser;
    wherein when attached to said laser, said rigid support is spaced apart from said laser tube, said aperture and optical element are disposed transverse to the optical axis and are aligned with the optical axis, and adjustment of said first, second, or third adjustable mounting devices changes the angular position of said optical element relative to the optical axis; and
    wherein each of the adjustable mounting devices comprises:
        a stud bolt having a first threaded end, a second threaded end, and a body portion interposed between the first threaded end and the second end that is larger in diameter than the first and second threaded ends, the first threaded end being slideably received in a hole in said support structure and extending through said hole, and the second threaded end being used to attach said support structure to the laser;
        a coil spring having a first end and a second end, said coil spring being slideably carried on the body portion of said stud bolt;
        an adjusting nut threaded onto said first threaded end so that the support structure is slideably interposed between said adjusting nut and the first end of said coil spring;
        wherein when said second threaded end of said stud bolt is attached to said laser, said spring biases said support structure away from said second threaded end of said stud bolt and toward said adjusting nut.

2. An adjustable mounting unit for an optical element of a gas laser according to claim 1, wherein said structure comprises a first arm and a second arm attached to the first arm, and the first arm and second arm enclose an angle.

3. An adjustable mounting unit for an optical element of a gas laser according to claim 2, wherein the enclosed angle is about 90°.

4. An adjustable mounting unit for an optical element of a gas laser according to claim 2 or 3, wherein the arms have different lengths.

5. An adjustable mounting unit for an optical element of a gas laser according to claim 2, wherein the first and second arms are attached to each other at end portions of the arms, and wherein said adjustable mounting devices are disposed at end portions of the arms.

6. An adjustable mounting unit for an optical element of a gas laser according to claim 1, wherein said stud bolt further comprises a spring stop on said body portion, said spring stop being disposed on the body portion proximate to the second threaded end of said stud bolt, and wherein the second end of said coil spring abuts said spring stop so that said coil spring is interposed between said spring stop and said support structure.

7. An adjustable mounting unit for an optical element of a gas laser according to claim 1, wherein said support structure further comprises a first, a second, and a third recess for receiving the first end of said coil springs of said first, second, and third adjustable mounting devices.

8. An adjustable mounting unit for an optical element of a gas laser according to claim 1, wherein said optical element is selected from the group consisting of a fully reflective mirror, a partially transparent, partially reflective mirror, and a fully transparent window.

9. An adjustable mounting unit for an optical element of a gas laser according to claim wherein said optical element is a fully reflective mirror.

10. An adjustable mounting unit for an optical element of a gas laser according to claim 1, wherein said optical element is a partially transparent, partially reflective mirror.

11. An adjustable mounting unit for an optical element of a gas laser according to claim 4, wherein the first arm is about twice as long as the second arm, and wherein the aperture is formed in the first arm.

12. An adjustable mounting unit for an optical element of a gas laser comprising a tube having a first end wall at one end and a second end wall at the other end and an optical axis extending longitudinally through the tube, wherein the tube defines a cavity for containing a laser gas therein, and the first end wall includes a port through which the optical axis of the laser passes, said mounting unit comprising:
    a rigid support structure, said support structure including an aperture;
    an optical element mounted within said aperture;
    a first, a second, and a third adjustable mounting device to attach said support structure to a first, second, and third mounting point on the laser, respectively, that are displaced in an axial direction by substantially the same amount due to dimensional changes in the laser occurring during the operation of the laser; wherein
        said support structure comprises a first arm and a second arm attached to the first arm, and the first arm and second arm enclose an angle;
        the first arm is about twice as long as the second arm, and wherein the aperture is formed in the first arm; and
        wherein when attached to said laser, said rigid support is spaced apart from said laser tube, said aperture and optical element are disposed transverse to the optical axis and are aligned with the optical axis, and adjustment of said first, second, or third adjustable mounting devices changes the angular position of said optical element relative to the optical axis.

13. An adjustable mounting unit for an optical element of a gas laser according to claim 12, wherein the enclosed angle is about 90°.

14. An adjustable mounting unit for an optical element of a gas laser comprising a tube having a first end wall at one end and a second end wall at the other end and an optical axis extending longitudinally through the tube, wherein the tube defines a cavity for containing a laser gas therein, and the first end wall includes a port through which the optical axis of the laser passes, said mounting unit comprising:

a rigid support structure, said support structure including an aperture;

an optical element mounted within said aperture;

a first, a second, and a third adjustable mounting device to attach said support structure to a first, second, and third mounting point on the laser, respectively, that are displaced in an axial direction by substantially the same amount due to dimensional changes in the laser occurring during the operation of the laser;

a flexible tube element comprising a base end, an optical element receiving end, an optical element receiving surface within said flexible tube element proximate to the receiving end, and a flexible section interposed between said base end and said receiving surface; wherein when attached to said laser, said rigid support is spaced apart from said laser tube, said aperture and optical element are disposed transverse to the optical axis and are aligned with the optical axis, and adjustment of said first, second, or third adjustable mounting devices changes the angular position of said optical element relative to the optical axis;

said base end is hermetically attached to the first end wall around the port so that the optical axis of the laser passes through said flexible tube element;

the exterior surface of said optical element receiving end is engaged with the aperture wall in said support structure; and said optical element is received by the optical element receiving surface within said flexible tube element and a hermetic seal is formed between said optical element and said optical element receiving surface.

15. An adjustable mounting unit for an optical element of a gas laser according to claim 14, wherein said flexible section comprises a bellows.

16. An adjustable mounting unit for an optical element of a gas laser according to claim 14, further comprising an externally threaded retainer sleeve, wherein said retainer sleeve is threadably engaged with the internal surface of the optical element receiving end of said flexible tubular element and said optical element is interposed between said retainer sleeve and said optical element receiving surface.

17. An adjustable mounting unit for an optical element of a gas laser according to claim 14, wherein said optical element is symmetrically disposed between an even number of said adjustable mounting devices.

18. An adjustable mounting unit for an optical element of a gas laser comprising a tube having a first end wall at one end and a second end wall at the other end and an optical axis extending longitudinally through the tube, wherein the tube defines a cavity for containing a laser gas therein, and the first end wall includes a port through which the optical axis of the laser passes, said mounting unit comprising:

a rigid support structure dimensioned to extend across the first end wall of the laser, said support structure including an aperture;

an optical element mounted within said aperture;

a first axially adjustable mounting device to attach said rigid support structure to a first location proximate to the rim of the laser tube;

a second axially adjustable mounting device to attach said rigid support structure to a second location proximate to the rim of the laser tube; and a third axially adjustable mounting device to attach said rigid support structure to a third location proximate to the rim of the laser tube; wherein said support structure comprises a first arm and a second arm attached to the first arm, and the first arm and second arm enclose an angle;

the first arm is about twice as long as the second arm, and wherein the aperture is formed in the first arm; and when said support structure is attached to the laser tube with said adjustable mounting devices, said rigid support is spaced apart from said laser tube, said aperture and optical element are disposed transverse to the optical axis and are aligned with the optical axis, and adjustment of said first, second, or third adjustable mounting devices changes the angular position of the optical element relative to the optical axis.

19. An adjustable mounting unit for an optical element of a gas laser according to claim 18, wherein the enclosed angle is about 90°.

20. An adjustable mounting unit for an optical element of a gas laser comprising a tube having a first end wall at one end and a second end wall at the other end and an optical axis extending longitudinally through the tube, wherein the tube defines a cavity for containing a laser gas therein, and the first end wall includes a port through which the optical axis of the laser passes, said mounting unit comprising:

a rigid support structure dimensioned to extend across the first end wall of the laser, said support structure including an aperture;

an optical element mounted within said aperture;

a first axially adjustable mounting device to attach said rigid support structure to a first location proximate to the rim of the laser tube;

a second axially adjustable mounting device to attach said rigid support structure to a second location proximate to the rim of the laser tube; and a third axially adjustable mounting device to attach said rigid support structure to a third location proximate to the rim of the laser tube;

wherein when said support structure is attached to the laser tube with said adjustable mounting devices, said rigid support is spaced apart from said laser tube, said aperture and optical element are disposed transverse to the optical axis and are aligned with the optical axis, and adjustment of said first, second, or third adjustable mounting devices changes the angular position of the optical element relative to the optical axis; and wherein each of the adjustable mounting devices comprises:

a stud bolt having a first threaded end, a second threaded end, and a body portion interposed between the first threaded end and the second threaded end, the first threaded end being slideably received in a hole in said support structure and extending through said hole, and the second threaded end being used to attach said support structure to the laser;

an adjusting nut threaded onto said first threaded end; and a biasing element biasing said support structure away from said second threaded end of said stud bolt and toward said adjusting nut.

21. An adjustable mounting unit for an optical element of a gas laser according to claim 20, wherein said support structure comprises a first arm and a second arm attached to the first arm, and the first arm and the second arm enclose an angle.

22. An adjustable mounting unit for an optical element of a gas laser according to claim 21, wherein the enclosed angle is about 90°.

23. An adjustable mounting unit for an optical element of a gas laser according to claim 21 or 22, wherein the arms have different lengths.

24. An adjustable mounting unit for an optical element of a gas laser according to claim 21, wherein the first and second arms are attached to each other at end portions of the arms, and wherein said adjustable mounting devices are disposed at end portions of the arms.

25. An adjustable mounting unit for an optical element of a gas laser according to claim 20, wherein said biasing element comprises a coil spring having a first end and a second end and is slideably carried on said stud bolt, and wherein the support structure is interposed between said adjusting nut and the first end of said coil spring.

26. An adjustable mounting unit for an optical element of a gas laser according to claim 25, wherein said stud bolt further comprises a spring stop on said body portion, said spring stop being disposed on the body portion proximate to the second threaded end of said stud bolt, and wherein the second end of said coil spring abuts said spring stop so that said coil spring is interposed between said spring stop and said support structure.

27. An adjustable mounting unit for an optical element of a gas laser according to claim 25, wherein said support structure further comprises a first, a second, and a third recess for receiving the first end of said coil springs of said first, second, and third adjustable mounting devices.

28. An adjustable mounting unit for an optical element of a gas laser according to claim 20, wherein said optical element is selected from the group consisting of a fully reflective mirror, a partially transparent, partially reflective mirror, and a fully transparent window.

29. An adjustable mounting unit for an optical element of a gas laser according to claim 23, wherein the first arm is about twice as long as the second arm, and wherein the aperture is formed in the first arm.

30. An adjustable mounting unit for an optical element of a gas laser comprising a tube having a first end wall at one end and a second end wall at the other end and an optical axis extending longitudinally through the tube, wherein the tube defines a cavity for containing a laser gas therein, and the first end wall includes a port through which the optical axis of the laser passes, said mounting unit comprising:

a rigid support structure dimensioned to extend across the first end wall of the laser, said support structure including an aperture;

an optical element mounted within said aperture;

a first axially adjustable mounting device to attach said rigid support structure to a first location proximate to the rim of the laser tube;

a second axially adjustable mounting device to attach said rigid support structure to a second location proximate to the rim of the laser tube;

a third axially adjustable mounting device to attach said rigid support structure to a third location proximate to the rim of the laser tube; and a flexible tube element comprising a base end, an optical element receiving end, an optical element receiving surface within said flexible tube element proximate to the receiving end, and a flexible section interposed between said base end and said receiving surface; wherein when said support structure is attached to the laser tube with said adjustable mounting devices, said rigid support is spaced apart from said laser tube, said aperture and optical element are disposed transverse to the optical axis and are aligned with the optical axis, and adjustment of said first, second, or third adjustable mounting devices changes the angular position of the optical element relative to the optical axis;

said base end is hermetically attached to the first end wall around the port so that the optical axis of the laser passes through said flexible tube element;

the exterior surface of said optical element receiving end is engaged with the aperture wall in said support structure; and said optical element is received by the optical element receiving surface within said flexible tube element and a hermetic seal is formed between said optical element and said optical element receiving surface.

31. An adjustable mounting unit for an optical element of a gas laser according to claim 30, wherein said flexible section comprises a bellows.

32. An adjustable mounting unit for an optical element of a gas laser according to claim 30, further comprising an externally threaded retainer sleeve, wherein said retainer sleeve is threadably engaged with the internal surface of the optical element receiving end of said flexible tubular element and said optical element is interposed between said retainer sleeve and said optical element receiving surface.

33. An adjustable mounting unit for an optical element of a gas laser according to claim 30, wherein said optical element is symmetrically disposed between an even number of said adjustable mounting devices.

34. A gas laser comprising:

a tube having a first end wall at one end and a second end wall at the other end, wherein said tube defines a cavity for containing a laser gas therein, and said first end wall includes a port;

an optical axis extending longitudinally through the tube and passing through the port;

a rigid support structure, said support structure including an aperture;

an optical element mounted within said aperture;

a first, a second, and a third adjustable mounting device attaching said support structure to a first, second, and third mounting point on said tube, respectively; wherein said mounting points are displaced in an axial direction by substantially the same amount due to dimensional changes in the laser occurring during the operation of the laser;

said rigid support is spaced apart from said laser tube;

said aperture and optical element are disposed transverse to the optical axis and are aligned with the optical axis;

adjustment of said first, second, or third adjustable mounting devices changes the angular position of said optical element relative to the optical axis;

said support structure comprises a first arm and a second arm attached to the first arm, and the first arm and second arm enclose an angle; and the first arm is about twice as long as the second arm, and wherein the aperture is formed in the first arm.

35. A gas laser according to claim 34, wherein the enclosed angle is about 90°.

36. A gas laser comprising:

a tube having a first end wall at one end and a second end wall at the other end, wherein said tube defines a cavity for containing a laser gas therein, and said first end wall includes a port;

an optical axis extending longitudinally through the tube and passing through the port;

a rigid support structure, said support structure including an aperture;

an optical element mounted within said aperture;

a first, a second, and a third adjustable mounting device attaching said support structure to a first, second, and third mounting point on said tube, respectively; wherein said mounting points are displaced in an axial direction by substantially the same amount due to dimensional changes in the laser occurring during the operation of the laser;

said rigid support is spaced apart from said laser tube;

said aperture and optical element are disposed transverse to the optical axis and are aligned with the optical axis;

adjustment of said first, second, or third adjustable mounting devices changes the angular position of said optical element relative to the optical axis; and wherein each of the adjustable mounting devices comprise:

a stud bolt having a first threaded end, a second threaded end, and a body portion interposed between the first threaded end and the second end that is larger in diameter than the first and second threaded ends, the first threaded end being slideably received in a hole in said support structure and extending through said hole, and the second threaded end being attached to said laser tube at one of the mounting points;

a coil spring having a first end and a second end, said coil spring being slideably carried on the body portion of said stud bolt;

an adjusting nut threaded onto said first threaded end so that the support structure is slideably interposed between said adjusting nut and the first end of said coil spring; wherein said spring biases said support structure away from said second threaded end of said stud bolt and toward said adjusting nut.

37. A gas laser according to claim 36, wherein said support structure comprises a first arm and a second arm attached to the first arm, and the first arm and second arm enclose an angle.

38. A gas laser according to claim 37, wherein the enclosed angle is about 90°.

39. A gas laser according to claim 37 or 38, wherein the arms have different lengths.

40. A gas laser according to claim 37, wherein the first and second arms are attached to each other at end portions of the arms, and wherein said adjustable mounting devices are disposed at end portions of the arms.

41. A gas laser according to claim 36, wherein said stud bolt further comprises a spring stop on said body portion, said spring stop being disposed on the body portion proximate to the second threaded end of said stud bolt, and wherein the second end of said coil spring abuts said spring stop so that said coil spring is interposed between said spring stop and said support structure.

42. An adjustable mounting unit for an optical element of a gas laser according to claim 36, wherein said support structure further comprises a first, a second, and a third recess for receiving the first end of said coil springs of said first, second, and third adjustable mounting devices.

43. A gas laser according to claim 36, wherein said optical element is selected from the group consisting of a fully reflective mirror, a partially transparent, partially reflective mirror, and a fully transparent window.

44. A gas laser according to claim 36, wherein said optical element is a fully reflective mirror.

45. A gas laser according to claim 36, wherein said optical element is a partially transparent, partially reflective mirror.

46. A gas laser according to claim 36, wherein said first, second, and third mounting points are proximate to the rim of the laser tube.

47. A gas laser according to claim 39, wherein the first arm is about twice as long as the second arm, and wherein the aperture is formed in the first arm.

48. A gas laser comprising:

a tube having a first end wall at one end and a second end wall at the other end, wherein said tube defines a cavity for containing a laser gas therein, and said first end wall includes a port;

an optical axis extending longitudinally through the tube and passing through the port;

a rigid support structure, said support structure including an aperture;

an optical element mounted within said aperture;

a first, a second, and a third adjustable mounting device attaching said support structure to a first, second, and third mounting point on said tube, respectively;

a flexible tube element comprising a base end, an optical element receiving end, an optical element receiving surface within said flexible tube element proximate to the receiving end, and a flexible section interposed between said base end and said receiving surface; wherein said mounting points are displaced in an axial direction by substantially the same amount due to dimensional changes in the laser occurring during the operation of the laser;

said rigid support is spaced apart from said laser tube;

said aperture and optical element are disposed transverse to the optical axis and are aligned with the optical axis;

adjustment of said first, second, or third adjustable mounting devices changes the angular position of said optical element relative to the optical axis;

said base end is hermetically attached to the first end wall around the port so that the optical axis of the laser passes through said flexible tube element;

the exterior surface of said optical element receiving end is engaged with the aperture wall in said support structure; and said optical element is received by the optical element receiving surface within said flexible tube element and a hermetic seal is formed between said optical element and said optical element receiving surface.

49. A gas laser according to claim 48, wherein said flexible section comprises a bellows.

50. A gas laser according to claim 48, further comprising an externally threaded retainer sleeve, wherein said retainer sleeve is threadably engaged with the internal surface of the optical element receiving end of said flexible tubular element and said optical element is interposed between said retainer sleeve and said optical element receiving surface.

51. A gas laser according to claim 48, wherein said optical element is symmetrically disposed between an even number of said adjustable mounting devices.

* * * * *